UNITED STATES PATENT OFFICE.

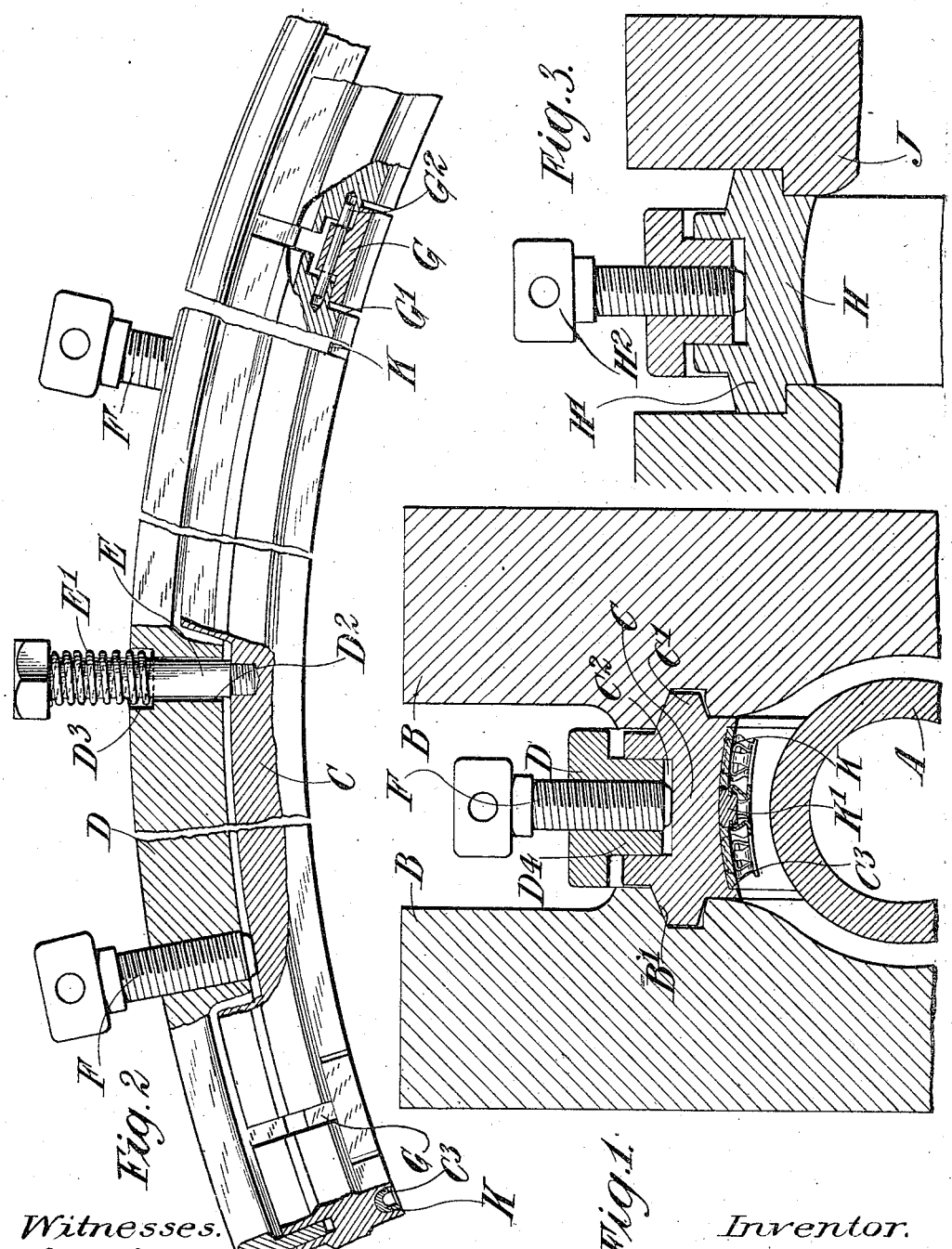

THOMAS SLOPER, OF DEVIZES, ENGLAND.

MOLD FOR THE MANUFACTURE OF RUBBER TIRES.

1,147,563.   Specification of Letters Patent.   Patented July 20, 1915.

Application filed December 15, 1914. Serial No. 877,330.

*To all whom it may concern:*

Be it known that I, THOMAS SLOPER, a subject of the King of England, residing at Devizes, in Wiltshire, England, have invented certain new and useful Improvements in Molds for the Manufacture of Rubber Tires, of which the following is a specification.

This invention is for improvements in or relating to molds for the manufacture of rubber tires and has for its object to provide a mold which will be more easy to handle and more effective in operation than those heretofore in use.

The invention relates to the type of mold in which separable side-plates are employed to mold the sides of the tire and the tread is molded by compression-segments, which, when the mold is together, lie between the side-plates and are thrust forward by bolts carried in a surrounding thrust-ring so that the rubber to be molded is compressed between an internal "former", the outer side-plates, and the compression-segments.

According to the present invention, there is employed with the thrust-ring and compression-segments of a tire-mold of the type described, means which connect the segments to the thrust-ring but permit of their being advanced by the adjusting-bolts. The connecting-means may take the form of one or more bolts for each segment which extends through the thrust-ring and is screwed into the segment. The head of the bolt prevents the segment from being detached from the thrust-ring, but permits a limited amount of movement to and from the ring. If desired, a spring may be inserted between the said head and the thrust-ring so that the segment is drawn back to the thrust-ring when the adjusting-bolts are released.

The invention also relates to other details hereinafter fully described and the novel features pointed out in the claims.

In the accompanying drawings:—Figure 1 is a transverse section through part of a mold constructed according to the present invention; Fig. 2 is a side-elevation of part of the circumferential ring and segmental members shown in Fig. 1, and Fig. 3 is a section through part of a mold according to another method of carrying out this invention.

The same letters indicate the same parts throughout the drawings.

The tire to be molded is built up on a "former" A, such as is commonly employed with molds for tires, and side-plates B, which may be annular, are placed on each side of the "former" and thrust toward each other to compress the rubber on the sides of the "former". With these parts it has been proposed to employ a ring built up of segments C to fill in the space between the plates B, and the plates have been channeled to receive the edges of the segments. In the drawings, the plates B are channeled at $B^1$ to receive lateral projections $C^1$ on the segments C, the channels and projections being both conveniently beveled so as to insure that the segments will be brought into proper position when the plates are clamped forcibly together. All these parts are well-known and it has before been proposed to hold segments similar to the segments C in position by an outer thrust-ring D provided with thrust-screws. The present invention, however, relates to the permanent connection of the segments C, which constitute a transversely divided ring, with the thrust-ring D. For this purpose, each segment has screwed into it at a point about midway of its length, a bolt or pin E which passes freely through a radial orifice $D^2$ in the ring D and is surrounded by a spring $E^1$. One end of this spring bears against the head of the bolt which stands out beyond the ring D, and the other end of the spring bears against the bottom of a recess $D^3$ in the outer face of the ring D.

Screwed into the ring D at intervals are adjusting-bolts F which project through the ring and bear against the segments C, a bolt being provided near the end of each segment.

In addition to the segments being permanently secured to the ring D, they are preferably guided by the ring so that they cannot become displaced laterally relatively thereto. This guiding is effected by an annular tongue $D^4$ on the inner face of the ring D, which tongue enters a channel $C^2$ on the outer face of the segments.

It will be appreciated that there is considerable advantage in having the compression-segments C carried by and guided by the thrust-ring D and segments to be placed in position round the "former" A on which the unvulcanized tire is supported and the segments to be so adjusted prior to clamping up the side-plates or rings B that the lateral projections $C^1$ on the segments will find their way into the grooves $B^1$ when the plates are drawn together; the engaging parts $B^1$ and $C^1$ are beveled so that clamping the plates together centers the segments C.

In use, the segmental rings C are advanced by the adjusting-bolts F so that the rubber is compressed between them and the final registration of the segments is effected, as already indicated, by clamping up the side-plates. In removing the segments, the bolts F are slacked and the spring $E^1$ holds each segment back toward the thrust-ring D after it is released from the tire, so that the thrust-ring with the segments can then be easily removed.

It is obvious that prior to advancing the segments C to their proper final position, gaps occur between the ends of the same. These may be covered by introducing a soft metal band between the inner faces of the segments and the tire, for example, an endless lead ring which is of such diameter as to fit within the segments when drawn back towards the thrust-ring, gives good results as this does not prevent the proper advance of the segments but adapts itself to the smaller circle formed when the segments are closed up. In Fig. 2, however, means are shown for closing up the gaps which do not require renewing from time to time as with the lead bands and do not constitute a separate detached element. Such means comprise a T-piece G placed between the adjacent ends of each two segments. The ends of the segments are recessed at $G^1$ to receive the T-piece, and the T-piece is held in place by a pin $G^2$ which passes through the stem of the T and enters recesses in the ends of the segments. The recess formed in the ends of the segments is of such dimensions that when the segments are closed up the T-piece fills the recess, but when they are drawn back a space is left between each side of the recess and the T-piece, as shown in Fig. 2; the head of the T overlapping the segments, however, prevents rubber from unduly spewing through the gap between the segments, as will be readily understood.

It is not essential for the segments C to have lateral projections $C^1$ beveled on each side to engage correspondingly shaped grooves in the side-plates B. In Fig. 3, segmental sections H are shown, which are provided with a square face on the inner side, and the plates J are correspondingly shaped to fit them. The plates, however, have no part which projects beyond the lateral projections $H^1$ of the segments H on the outer side of the segments, so that with this arrangement the segments may be adjusted accurately by the bolts $H^2$ when the side-plates J are partly bolted up and then the plates J can be finally bolted home.

The inner face of the segments C or H may be shaped to mold any desired pattern on the tread, as well as to give it its general shape, or if a soft metal band is employed as described above, this may be shaped to produce the required pattern on the tread.

Where a lead band is employed the segments C or H may be channeled on the inner face as shown at $C^3$, Figs. 1 and 2. In these figures a lead band K is shown. This band in addition to bridging the gaps between the segments is perforated to receive studs $K^1$ which are to be embedded in the tire. The use of a lead band to hold studs in this manner is known, and in itself constitutes no part of the present invention, but the segments being carried by the ring and adjustable by the bolts F constitute a convenient means for holding the lead band in place and positioning it properly relatively to the side-plates B or J.

Obviously the lateral projections $H^1$ need not be beveled on the inner face, but in whatever way they are shaped, the corresponding butting portions of the plates J must also be shaped, for example they may be square as shown in Fig. 3.

The springs $E^1$ may be omitted from the bolts E if desired, and the segments merely pulled back by hand after slacking the bolts F.

What I claim as my invention and desire to secure by Letters Patent is:—

1. In a mold for manufacturing rubber tires, the combination of separable side-plates for molding the sides of the tire, a ring divided transversely into a series of compression-segments situated between the side-plates to mold the tread of the tire, a thrust-ring surrounding the divided-ring, adjusting means operating between the thrust-ring and each compression-segment of the divided ring to advance or withdraw such segments relatively to the thrust-ring, and means which permanently connect the segments of the divided-ring to the thrust-ring without interfering with such adjusting movement, substantially as set forth.

2. In a mold for manufacturing rubber tires, the combination of separable side-plates for molding the sides of the tire, a ring divided transversely into a series of compression-segments situated between the side-plates to mold the tread of the tire, a thrust-ring surrounding the divided-ring, adjusting means operating between the thrust-ring and each compression-segment of the divided-ring to advance or withdraw such segments relatively to the thrust-ring, means which permanently connect the segments of the divided-ring to the thrust-ring without interfering with such adjusting movement, one of these parts (that is the thrust-ring or the divided-ring) being provided with guiding means to retain the two parts in alinement with each other during the adjusting movement of the segments, substantially as set forth.

3. In a mold for manufacturing rubber tires, the combination of, separable side-plates for molding the sides of the tire, a ring divided transversely into a series of compression-segments situated between the side-plates to mold the tread of the tire, a thrust-ring surrounding the divided-ring, adjusting means operating between the thrust-ring and each compression-segment of the divided-ring to advance or withdraw such segments relatively to the thrust-ring, and means which permanently connect the segments of the divided-ring to the thrust-ring without interfering with such adjusting movement, one of these parts (that is the thrust-ring or the divided-ring) having a peripheral tongue ($D^4$) and the other a peripheral channel ($C^2$) which tongue and channel engage with each other so that the segments are guided in their adjusting movements relatively to the thrust-ring, substantially as set forth.

4. In a mold for manufacturing rubber tires, the combination of, separable side-plates for molding the sides of the tire, a ring divided transversely into a series of compression-segments situated between the side-plates to mold the tread of the tire, a thrust-ring surrounding the divided-ring, adjusting-means operating between the thrust-ring and each compression-segment of the divided-ring to advance or withdraw such segments relatively to the thrust-ring, means which permanently connect the segments of the divided-ring to the thrust-ring without interfering with such adjusting movement, and means for bridging the gaps between the ends of the segmental members, substantially as set forth.

5. In a mold for manufacturing rubber tires, the combination of, separable side-plates for molding the sides of the tire, a ring divided transversely into a series of compression-segments situated between the side-plates to mold the tread of the tire, a thrust-ring surrounding the divided-ring, adjusting means operating between the thrust-ring and each compression segment of the divided-ring to advance or withdraw such segments relatively to the thrust-ring, means which permanently connect the segments of the divided-ring to the thrust-ring without interfering with such adjusting movement, each of the segments having at its end a recess in that face which is toward the tread and extending across the whole face corresponding to the tread, and independent bridging-pieces mounted one in each pair of adjacent recesses to overlap the segments and cover the gaps between adjacent segments, substantially as set forth.

6. In a mold for manufacturing rubber tires, the combination of, separable side-plates for molding the sides of the tires, a ring divided transversely into a series of compression-segments situated between the side-plates to mold the tread of the tire, a thrust-ring surrounding the divided-ring, adjusting-means operating between the thrust-ring and each compression segment of the divided-ring to advance or withdraw such segments relatively to the thrust-ring, means which permanently connect the segments of the divided-ring to the thrust-ring without interfering with such adjusting movement, each of the segments having at its end a stepped recess ($G^1$) in that face which is toward the tread, the larger portion of the recess extending across the whole face corresponding to the tread, independent T-shaped bridging-pieces (G) mounted one in each pair of adjacent recesses, and means ($G^2$) to hold each T-piece in position so that its T-head overlaps the segments and covers the gaps between adjacent segments, substantially as set forth.

7. In a mold for manufacturing rubber tires, the combination of, separable side-plates for molding the sides of the tire, a ring divided transversely into a series of compression-segments situated between the side-plates to mold the tread of the tire, a thrust-ring surrounding the divided-ring, adjusting means operating between the thrust-ring and each compression-segment of the divided-ring to advance or withdraw such segments relatively to the thrust-ring, radial pins (E) on the outer periphery of the divided-ring which extend through holes in the thrust-ring, and yielding means ($E^1$) operating between the pins and thrust-ring which means always tends to draw the segments of the divided-ring toward the thrust-ring, substantially as set forth.

8. In a mold for manufacturing rubber tires, the combination of, separable side-plates for molding the sides of the tire, a ring divided transversely into a series of compression-segments situated between the side-plates to mold the tread of the tire, a thrust-ring surrounding the divided-ring, adjusting means operating between the thrust-ring and each compression-segment of the divided-ring to advance or withdraw such segments relatively to the thrust-ring, and means which permanently connect the segments of the divided-ring to the thrust-ring without interfering with such adjusting movement, the thrust-ring having a channel on that face which is toward the tread to receive a soft metal band, substantially as set forth.

9. In a mold for manufacturing rubber tires, the combination of, separable side-plates for molding the sides of the tire, a ring divided transversely into a series of compression-segments situated between the side-plates to mold the tread of the tire, a thrust-ring surrounding the divided-ring, adjusting means operating between the thrust-ring and each compression-segment of the divided-ring to advance or withdraw such segments relatively to the thrust-ring, and means which permanently connect the segments of the divided-ring to the thrust-ring without interfering with such adjusting movement, the sides of the divided-ring and the opposed faces of the side-plates being provided one with a tongue and the other with a coöperating groove, the coöperating parts being beveled so that as the plates are forced together the divided-ring will be centered, substantially as set forth.

In testimony whereof I have signed my name to this specification in the presence of two subscribing witnesses.

THOMAS SLOPER.

Witnesses:
HAROLD PARSONS,
W. L. AVEREL.